United States Patent
Blond

(10) Patent No.: US 9,926,004 B2
(45) Date of Patent: Mar. 27, 2018

(54) POWER STEERING SYSTEM FOR A VEHICLE

(71) Applicant: VOLVO TRUCK CORPORATION, Göteborg (SE)

(72) Inventor: Jean-Marc Blond, Saint Pierre de Chandieu (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/443,399

(22) PCT Filed: Dec. 18, 2012

(86) PCT No.: PCT/IB2012/003043
§ 371 (c)(1),
(2) Date: May 18, 2015

(87) PCT Pub. No.: WO2014/096893
PCT Pub. Date: Jun. 26, 2014

(65) Prior Publication Data
US 2015/0298729 A1 Oct. 22, 2015

(51) Int. Cl.
*B62D 5/06* (2006.01)
*B62D 5/065* (2006.01)
(Continued)

(52) U.S. Cl.
CPC .............. *B62D 5/065* (2013.01); *B62D 5/04* (2013.01); *B62D 5/0409* (2013.01); *B62D 5/06* (2013.01);
(Continued)

(58) Field of Classification Search
CPC .................................. B62D 6/02; B62D 5/065
(Continued)

(56) References Cited

U.S. PATENT DOCUMENTS

| 3,326,318 A * | 6/1967 | De Bevoise | B62D 37/06 180/2.2 |
| 3,456,752 A * | 7/1969 | Fonda | B62D 5/06 180/421 |

(Continued)

FOREIGN PATENT DOCUMENTS

JP S6154365 A 3/1988

OTHER PUBLICATIONS

International Search Report (dated Sep. 12, 2013) for corresponding International App. PCT/IB2012/003043.

*Primary Examiner* — Joseph M Rocca
*Assistant Examiner* — Conan D Duda
(74) *Attorney, Agent, or Firm* — WRB-IP LLP

(57) ABSTRACT

A power steering system includes a first steering mechanism designed to control the steering of at least one of the wheels of a steered axle and includes a mechanical transmission of the movement from a steering wheel of the vehicle to the wheel, a first actuator controlled by a parameter related to the steering wheel movement and capable of providing a steering assistance effort to the wheel. The power steering system further includes a second steering mechanism which includes a second actuator capable of providing a steering assistance effort to at least one of the wheels of the same axle, the second actuator having a housing which is secured to the axle, a first and a second piston rods able to slide through the housing and extending, on opposite sides, beyond the housing, with the piston rods being substantially parallel to the axle.

13 Claims, 3 Drawing Sheets

(51) Int. Cl.
*B62D 5/04* (2006.01)
*B62D 6/02* (2006.01)
*B62D 5/08* (2006.01)
*B62D 5/12* (2006.01)

(52) U.S. Cl.
CPC .............. *B62D 5/08* (2013.01); *B62D 5/12* (2013.01); *B62D 6/02* (2013.01)

(58) Field of Classification Search
USPC ........................................................ 180/421
See application file for complete search history.

(56) References Cited

U.S. PATENT DOCUMENTS

| | | | | |
|---|---|---|---|---|
| 3,991,846 | A * | 11/1976 | Chichester | B62D 5/065 180/403 |
| 7,389,849 | B2 * | 6/2008 | Williams | B62D 5/09 180/417 |
| 2006/0175119 | A1 | 8/2006 | Broughton | |
| 2007/0095598 | A1 * | 5/2007 | Williams | B62D 5/0466 180/441 |
| 2009/0038876 | A1 * | 2/2009 | Ito | B62D 3/14 180/421 |
| 2009/0272598 | A1 * | 11/2009 | Gehlhoff | B62D 1/22 180/442 |
| 2010/0152971 | A1 | 6/2010 | Shiino et al. | |
| 2010/0307857 | A1 * | 12/2010 | Shinagawa | B62D 5/06 180/421 |
| 2013/0118826 | A1 * | 5/2013 | Izutani | B62D 5/065 180/421 |
| 2013/0161113 | A1 * | 6/2013 | Sakamaki | B62D 5/09 180/421 |
| 2015/0239498 | A1 * | 8/2015 | Cao | B62D 7/144 180/24.01 |

* cited by examiner

POWER STEERING SYSTEM FOR A VEHICLE

BACKGROUND AND SUMMARY

The present invention relates to a power steering system for a vehicle, especially an industrial vehicle such as a heavy truck.

A power steering system has been a standard feature in vehicles for many years, in particular in industrial vehicles. Such a system assists the vehicle driver by applying a force to the wheels, through a steering actuator, which complements the effort of the driver which is mechanically transmitted from the steering wheel to the steered wheels of the vehicle. Therefore, a lower effort is required for the driver when turning the steering wheel and the vehicle is easier to manoeuvre.

Typically, a power steering system comprises a steering gear including the actuator capable of providing a steering assistance effort to at least one of the wheels of the axle. This actuator is controlled by a parameter related to the steering wheel movement, for example as a function of the steering effort exerted by the driver on the steering wheel.

A mechanical arrangement makes it possible, on the one hand, to transmit the movement of the actuator to the steered wheel and, on the other hand, to transmit the movement of said steered wheel to the other wheel of the same axle.

However, a significant drawback of such a conventional power steering system is that it comprises heavy pans, and that it requires space—while the corresponding allotted space is generally limited. Therefore, the implementation of such a system leads to heavy packaging work and involves some limitations due to the size of the wheels and/or of the vehicle frame.

It therefore appears that, from several standpoints, there is room for improvement in power steering systems for vehicles.

It is desirable to provide an improved power steering system for a vehicle.

It is also desirable to provide a power steering system which requires less space than the prior art systems and which has a reduced weight, while also being effective and reliable.

According to a first aspect, the invention relates to a power steering system for a vehicle having at least one steered axle joining two wheels, the power steering system comprising a first steering mechanism designed to control the steering of at least one of the wheels, and comprising:
  a mechanical transmission of the movement from a steering wheel of the vehicle to at least one of the wheels;
  a first actuator controlled by a parameter related to the steering wheel movement and capable of providing a steering assistance effort to at least one of the wheels;
  the power steering system further comprising a second steering mechanism designed to control the steering of at least one of the wheels of said same axle, said second steering mechanism including a second actuator capable of providing a steering assistance effort to at least one of the wheels of said axle, the second actuator having:
  a housing which is secured to the axle;
  a first and a second piston rods able to slide through the housing and extending, on opposite sides, from inside to outside of the housing, with said piston rods being substantially parallel to said axle.

Thus, with the power steering system according to an aspect of the invention, the wheels of the axle can be steered by means of a first actuator and/or a second actuator. In practice, the steering assistance is primarily provided, by the first actuator, while the second actuator can either act simultaneously with the first one, to provide an additional steering assistance to the wheels of the same axle, or not be used, depending on the current needs.

More precisely, an advantageous way of using an aspect of the invention is to provide a first actuator which is dimensioned in order to be capable to provide the steering assistance required in most cases, for example in 90% of cases. The second actuator is then used to provide the extra steering assistance needed in specific conditions, preferably occasionally. The second actuator therefore acts as a means intended to provide a boost to steering assistance when imposed by conditions. For example, the first actuator can be dimensioned to meet the needs for a vehicle running at high speed on a highway, and the second actuator can be used to provide the additional effort which is required for manoeuvring the vehicle at low speed.

As a consequence, owing to an aspect of the invention, the first actuator size can be reduced as compared to conventional actuators, without waiting the power steering system efficiency insofar as a second actuator is provided for specific cases. This results in a less cumbersome steering gear, therefore saving space in the area of said steering gear and making it possible to lower the cab and/or implement a bigger cooling pack, for example.

Downsizing the first actuator also results in downsizing the mechanical arrangement connecting the steering gear and the steered wheel, in particular the drag link. Components of the first steering mechanism are thus less cumbersome and less heavy, which is a further advantage of an aspect of the invention.

Besides, the impact of the second actuator on the system overall size is fairly low. On the one hand, there is no need to install said second actuator in the steering gear or close to it. Thus, said actuator can be located in an area where more space is available. On the other hand, positioning the piston rods of the second actuator parallel to the axle makes it possible to reduce the space occupied by said second actuator, and to avoid protruding parts.

Even is the second actuator according to an aspect of the invention can be an actuator of any type and, for instance, an electric or a pneumatic actuator, the second actuator is preferably a hydraulic actuator. In this case the housing of the second actuator is a cylinder barrel and the second actuator comprises a movable piston located in said cylinder barrel and defining inside it at least a first and a second chambers. The piston is connected, on opposite sides thereof, respectively to said first and second piston rods. Thanks to this hydraulic arrangement, the packaging of the second actuator and so the packaging of the power steering system according to an aspect of the invention is greatly improved.

According to an other preferred embodiment, the first steering mechanism comprises a track rod connected to the wheels of said axle in order to allow transmission of the steering movement from one wheel to the other wheel, the piston rods forming part of the track rod.

In other words, the axis of the second actuator is coincident with the track rod axis, the cylinder barrel being interposed between two portions of the track rod. Typically, the track rod can include two links rods and the two piston rods, each link rod having an end connected to the end of a piston rod opposite the piston of the second actuator and a second end connected to one wheel, possibly by means of an intermediate member.

This disposition makes it possible to further reduce the size of the power steering system, more specifically in the area of the second actuator. Furthermore, with this implementation, the second actuator can steer both wheels, and higher efforts can be transmitted to the wheels by the second actuator.

In an implementation, the axle is a front axle of the vehicle, either the single front axle of the vehicle or one of the front axles of the vehicle.

The first actuator can be an electric, actuator, which is particularly interesting especially for long haul trucks that need a fairly low steering assistance when running on highways, since it has a low consumption.

Alternatively, the first actuator can be a hydraulic, actuator, which is capable of providing a high steering assistance.

In this embodiment, the second actuator can be hydraulically coupled to the first actuator, so that the pressures in the chambers of the second actuator are substantially identical to the pressures in the chambers of the first actuator, when said actuators are connected.

The power steering system may further comprise disconnecting means arranged between the first and second actuators in order to allow the second actuator to be hydraulically disconnected from the first actuator. Disconnecting the actuators may be done in case of a failure, especially on the second actuator or on the corresponding hydraulic circuit, the disconnecting means then having a safety function. The actuators may also be disconnected if no additional steering assistance is needed, the first actuator being sufficient to provide alone the required assistance; in this case, the piston of the second actuator can move freely inside the cylinder barrel, in order not to impair the operation of the first steering mechanism.

Preferably, the first actuator can be always active, meaning that it is permanently operatively connected to one wheel, whether it actually provides steering, assistance or not at a given moment. On the contrary, the second actuator can be coupled to the first actuator, meaning that there exist structural means effectively providing a possible connection between said actuators, but either connected or disconnected from said first actuator, meaning, that, functionally, there is actually or not a fluid communication between the actuators.

Providing disconnecting means can be particularly advantageous in case the second actuator is located on a front axle, insofar as it is then exposed and could be damaged.

For example, the disconnecting means comprise an isolation valve which can be switched between:
 a first position, in which the second actuator is in fluid communication with the first actuator;
 and a second position, in which the second actuator is hydraulically isolated from the first actuator and the first and second chambers of the second actuator are in fluid communication.

This isolation valve can typically be arranged on conduits joining the chambers of the first and the second actuators, and can be controlled by control means depending on various parameters as will be explained later. The first position can be used during normal operation of the system, when there is a need for an extra steering assistance. The second position can be used either during normal operation of the system, when no extra steering assistance is required, or in case of a failure, especially on the second actuator or its hydraulic circuit. In the second position, the first actuator can steer wheels independently from the second actuator.

The power steering system can comprise control means capable of switching the isolation valve from one position to another depending on the pressure received by the first actuator. For example, an increase in said pressure indicates that there is a need for further steering assistance, and as a consequence, the second actuator is activated, the isolation valve being moved to its first position.

The power steering system can further comprise a pump arranged to provide the extra flow of hydraulic fluid required in case the second actuator is hydraulically connected to the first actuator (i.e. when the isolation valve is in its first position). This pump can be an additional pump, such as an electro pump. Alternatively, the power steering system can comprise a variable displacement pump capable of adjusting the flow it provides, for example a pump with a first low displacement and a second high displacement.

The second actuator can be controlled by a parameter related to the steering wheel movement, such as the steering wheel angle, the steering wheel speed, or the steering effort—or torque—on the steering wheel. In case an isolation valve is provided, said control means can be capable of switching the isolation valve from one position to another depending on said parameter.

Alternatively, the second actuator can be controlled by the pressure received by the first actuator.

Besides, the power steering system can comprise control means capable of deactivating the second actuator, in particular in case the vehicle speed is greater than a predetermined threshold, for example above 60 km/h. Indeed, at relatively high speeds, there is no need for a high steering assistance effort. In case an isolation valve is provided, said control means can be capable of switching the isolation valve to the second position when the vehicle speed is greater than said threshold.

According to a second aspect, the invention relates to a vehicle having at least one steered axle joining two wheels and comprising a power steering system as previously described.

These and other features and advantages will become apparent upon reading the following description in view of the drawing attached hereto representing, as non-limiting examples, embodiments of a vehicle according to an aspect of the invention.

BRIEF DESCRIPTION OF THE DRAWINGS

The following detailed description of several embodiments of the invention is better understood when read in conjunction with the appended drawings, it being however understood that the invention is not limited to the specific embodiments disclosed.

DETAILED DESCRIPTION

The invention concerns, according to an aspect thereof, a power steering system 1 which is intended for a vehicle 2 having at least one steered axle joining two wheels.

Figure 1:
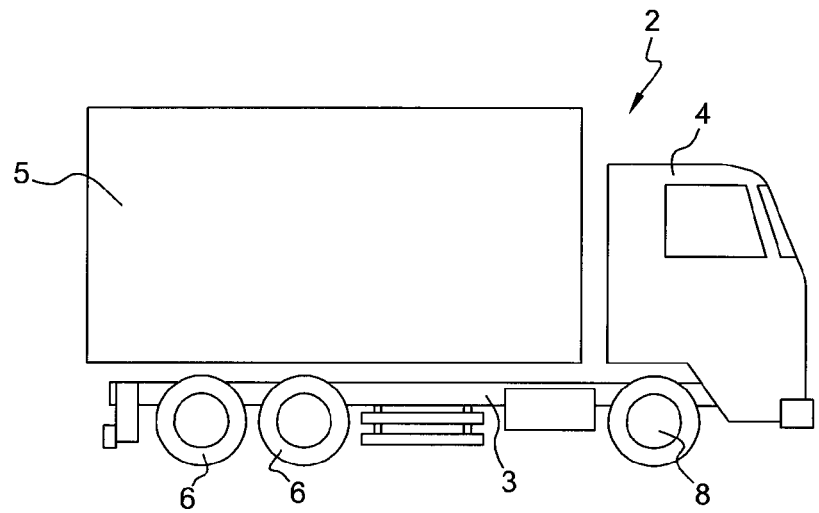
FIG. 1 is a side view of a vehicle having one steered axle.

Such a vehicle 2 is illustrated in FIG. 1. The vehicle 2 comprises a frame 3, a cab 4 and a rear part 5 which can be, for example, a cargo body. The vehicle 2 has rear axles, typically two rear axles which each join two rear wheels 6, as well as one front steered axle 7 joining two wheels 8.

Typically, such a vehicle can be a delivery truck, a medium or a heavy truck. The vehicle 2 illustrated on FIG. 1 has one front steered axle, but this should not be considered as limitative. The invention can be used, according to an aspect thereof, in a vehicle having more than one front steering axle, for instance, two steering axles.

The vehicle 2 can be equipped with a power steering system 1 according to an aspect of the invention, which will now be described.

The steering of the wheels 8 is controlled by a first steering mechanism 11.

The first steering mechanism 11 first of all comprises a mechanical transmission of the movement front a steering wheel of the vehicle 2 to at least one of the wheels, hereafter called the steered wheel 8a, as opposed to the other wheel 8b.

This mechanical transmission may include a steering wheel 12, or any other type of driver interface member, which is mechanically connected to a steering column 13 to drive a steering gear 15 which is connected to the wheels 8 by a mechanical arrangement. This mechanical arrangement may include a drop arm 17 which transmits the steering movement from the steering gear 15 to an upper steering, arm 18 via a drag link 19. From the upper steering arm 18, the movement continues to the steering knuckle 20 which makes the steered wheel 8a turn. To make sure that the other wheel 8b turns too, the steering wheel movement is transmitted from the steering knuckle 20 with the aid of a lower steering arm 21, a track rod 22 and a further lower steering arm 23 to the steering knuckle 24 of the other wheel 8b.

Thus, the first steering mechanism 11 comprises an entirely mechanical transmission system for transmitting the movements of the steering wheel 22 to the steered wheel 8a. The steering gear can for example be of the ball and nut type, as in the shown example, to change the rotating movement of the steering column in another rotating movement, for example around a perpendicular axis. The steering gear could alternatively be of the rack and pinion type to transform the rotating movement of the steering column into a linear movement.

The first steering mechanism 11 also comprises a first actuator 26 which is controlled by a parameter related to the steering wheel movement, such as the steering wheel angle, the steering wheel speed, or the steering effort—or torque—on the steering wheel, and which is capable of providing a steering assistance effort to the steered wheel 8a when needed. The effort delivered by the first actuator 26 is preferably set as a function of a steering effort exerted by the driver on the steering wheel 12. Such an effort is dependent on the resisting effort which the ground exerts on the wheels 8 of the vehicle 2, opposing their movement around their steering axis. In a conventional embodiment, the first actuator 26 is integrated with the steering gear 15.

According to an aspect of the invention, the power steering system 1 further comprises second steering mechanism 28 designed to control the steering of at least one of the wheels 8 of said same axle 7. The second steering mechanism 28 includes a second actuator 29 which is capable of providing an extra steering assistance effort to at least one of the wheels 8 of said axle 7, when needed. The second actuator 29 can typically be controlled by a parameter related to the steering wheel movement, in particular but not exclusively by the steering effort exerted by the driver on the steering wheel 12.

The second actuator 29 is preferably a hydraulic actuator and the following examples are described accordingly. It comprises a cylinder barrel 30 which is secured to the axle 7. For that purpose, there can be provided at least two fixing devices 31 transversally spaced apart, ensuring the cylinder barrel 30 is substantially parallel to the axle 7. The fixing devices 31 can include elastically deformable parts in order to accommodate the slight deformation of the axle 7 in the vertical direction, due to the load.

The second actuator 29 also comprises a movable piston 32 located in said cylinder barrel 30. The piston 32 defines inside the cylinder barrel 30 a first chamber 33 and a second chamber 34. The piston 32 is connected, on opposite sides thereof, respectively to a first piston rod 35 and a second piston rod 36, which are substantially parallel to the axle 7. The second actuator 29 is therefore a through rod cylinder. A sealing member (not shown) is provided between each piston rod 35, 36 and the cylinder barrel 30.

The end of the first piston rod 35, respectively the second piston rod 36, which is opposite the piston 32 is connected to one end of a first link rod 37, respectively a second link rod 38. The other ends of said link rods 37, 38 are connected to the corresponding lower steering arm 21, 23. Thus, the link rods 37, 38 and piston rods 35, 36 form part of the track rod 22.

As a consequence, the piston rods 35, 36 contributes to connecting the wheels 8, and to allow transmission of the steering movement from the steered wheel 8a to the other wheel 8b. Furthermore, the second actuator 29 can steer both wheels 8a, 8b.

Since the steering loads are split between the steering gear 5 and the second actuator 29, the loads are also split between the drag link 19 and the link rods 36, 37, allowing downsizing of said drag link 19 and link rods 36, 37.

Figure 2:
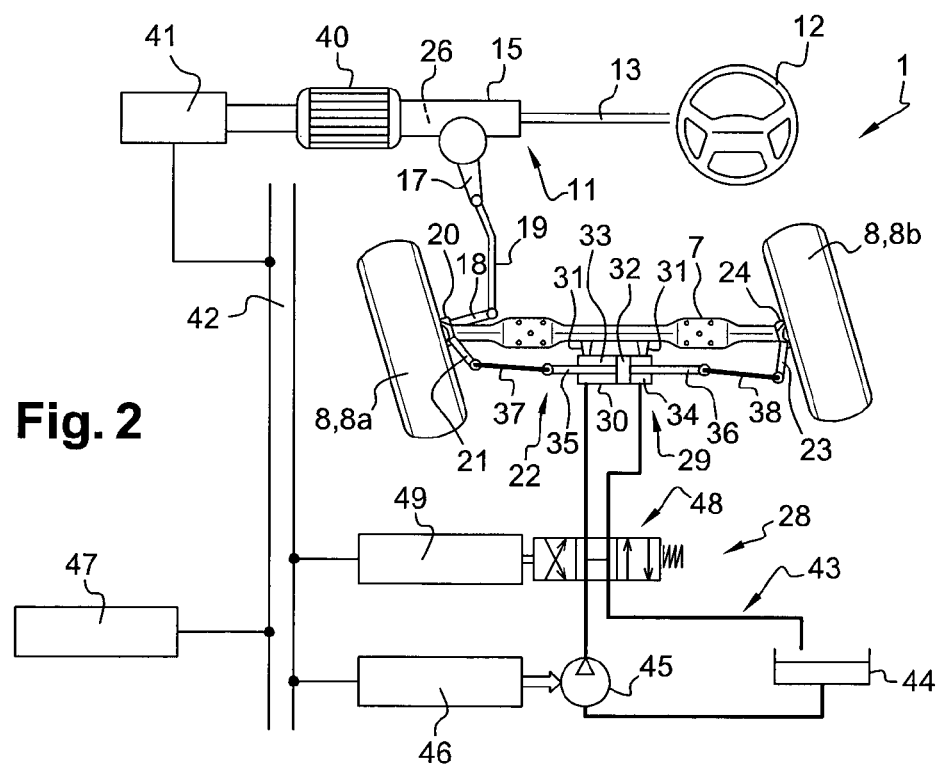
FIG. 2 is a schematic and partial representation of a vehicle showing a steered axle and a power steering system according to a first embodiment of the invention.
Figure 3:
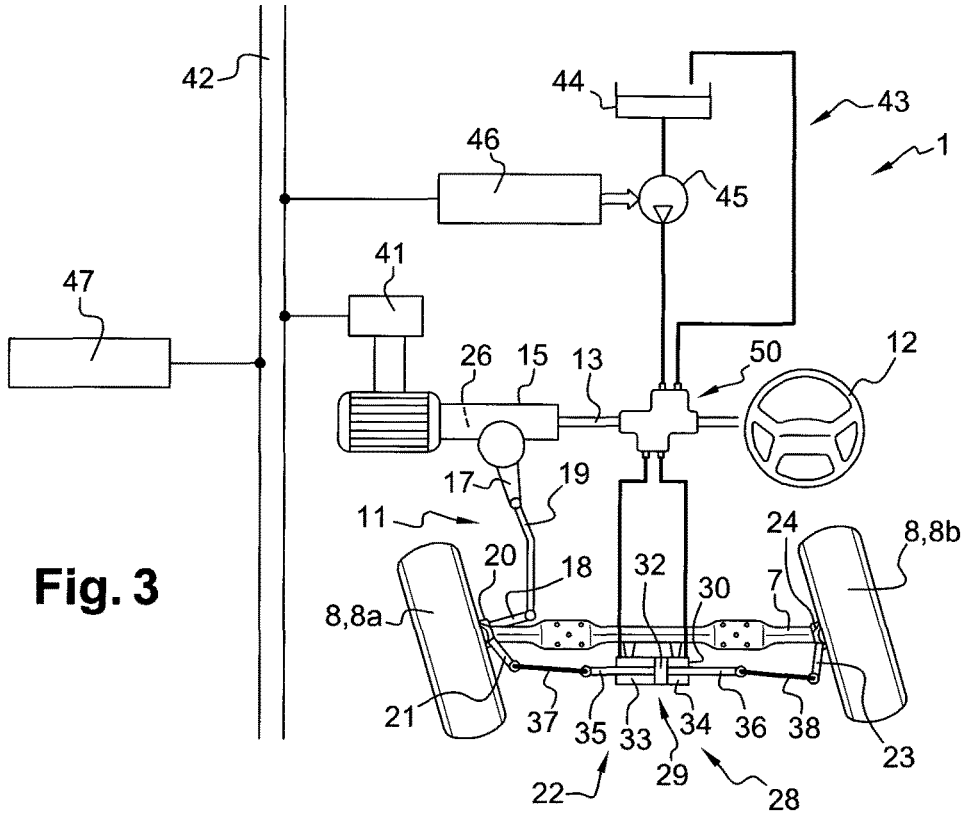
FIG. 3 shows a variant of the power steering system of FIG. 2.

According to a first embodiment of an aspect of the invention, depicted in FIGS. 2 and 3, the first actuator 26 is an electric actuator, i.e. an actuator powered by electric energy. A motor 40 is therefore coupled to the first actuator 26, generally close to the steering gear 15, to power said first actuator 26. The motor 40 is controlled by a motor control unit 41 connected to a communication bus 42, such as a CAN bus.

The second steering mechanism 28 comprises a hydraulic circuit 43 including the second actuator 29. Said hydraulic circuit 43 can typically comprise a tank 44 and a pump 45 which can be powered by a mechanical power source 46 controlled via the communication bus 42 by an electronic control unit 47.

In the variant of FIG. 2, the second steering mechanism 28 further comprises a valve 48 arranged in the hydraulic circuit 43 and which can be switched between three positions by means of a valve control unit 49 connected to the communication bus 42. In a first position, i.e. the central position in the illustration of FIG. 2, the valve 28 by-passes the second actuator 29 which is then deactivated and cannot provide a steering assistance to the wheels 8. In a second and third positions, the hydraulic fluid from the tank 44 is made to flow to the first chamber 33 or the second chamber 34 of the cylinder barrel 30, depending on the action exerted by the driver on the steering wheel 12. In this variant, the operation of the second steering mechanism 28, in particular the operation of the valve 28, including the possible deactivation of the second actuator 29, is achieved by means of the electronic control unit 47.

In the variant of FIG. 3, the hydraulic circuit 43 comprises a mechanical system 50 including a valve arranged on the steering column 13. This makes it possible to mechanically control the operation of the second actuator 29 by allowing hydraulic fluid to flow to the appropriate chamber 33, 34 of the cylinder barrel 30—or to none of said chambers—depending on the action exerted by the driver on the steering wheel 12. In practice, the valve of the mechanical system 50 is a proportional valve identical to the one used in the mechanical system 60 such as depicted in FIGS. 4 to 6.

Figure 4:
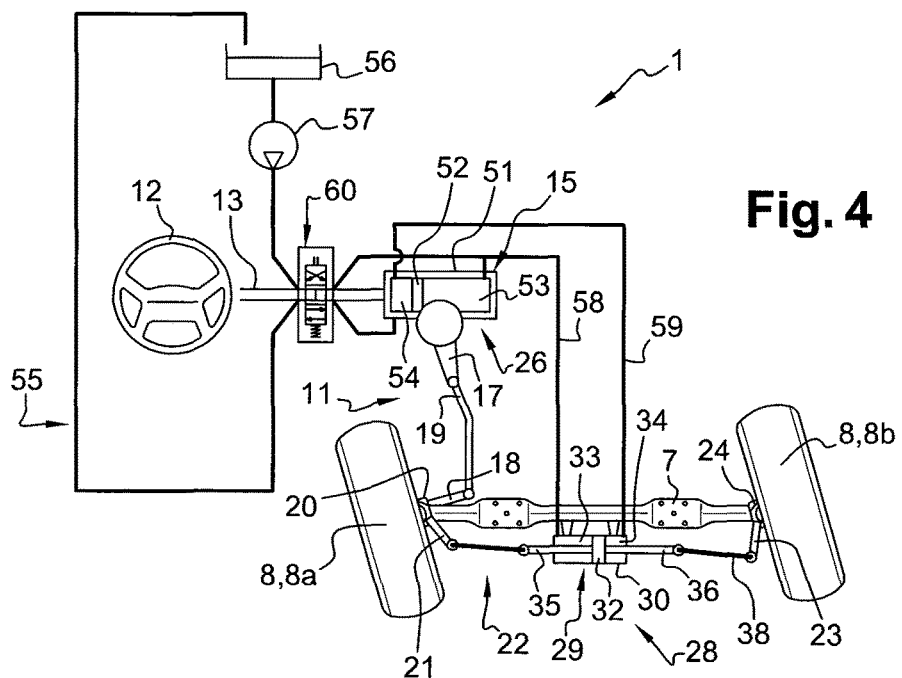
FIG. 4 is a schematic and partial representation of a vehicle showing a steered axle and a power steering system according to a second embodiment of the invention.
Figure 5:
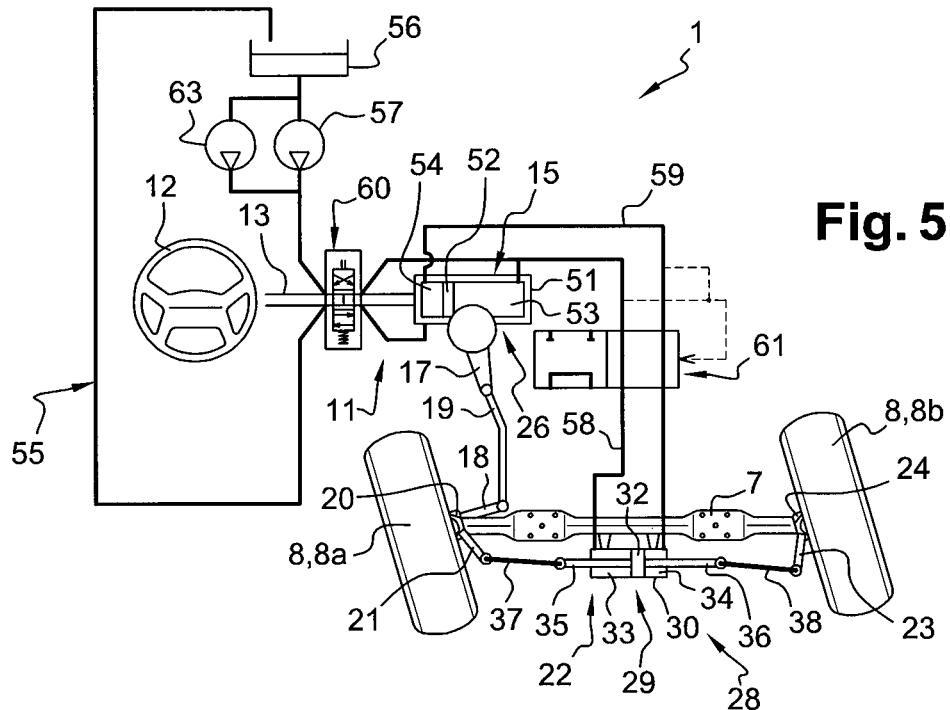
FIGS. 5 and 6 show a variant of the power steering, system of FIG. 4, including an isolation valve, said isolation valve being respectively in a first position and in a second position.
Figure 6:
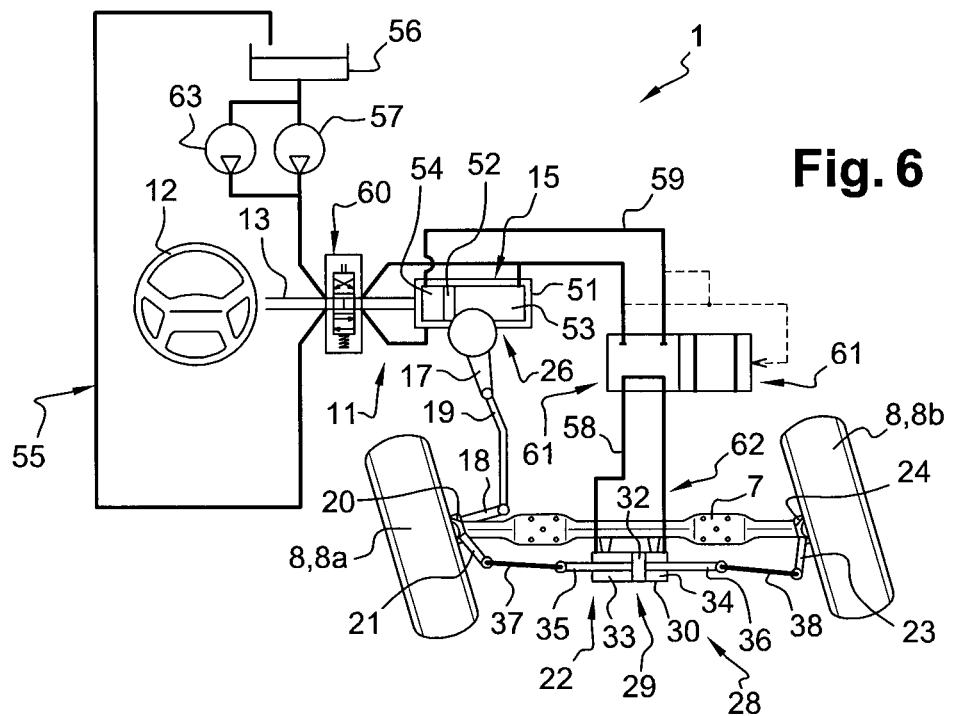

According to a second embodiment of an aspect of the invention, depicted in FIGS. 4 to 6, the first actuator 26 is a hydraulic actuator. It can typically comprise a cylinder barrel 51 in which a piston 52 can slide, the piston 52 defining inside the cylinder barrel 51 a first chamber 53 and a second chamber 54. A hydraulic circuit 55 including a tank 56 and a pump 57 makes it possible to direct hydraulic fluid in one of the two chambers 53, 54 depending on the action exerted by the driver on the steering wheel 12, in order to provide a steering assistance.

In the illustrated implementations, the second actuator 29 is hydraulically coupled to the first actuator 26. In practice, the hydraulic circuit 55 comprises a first conduit 58 between the first chambers 53, 33 of the first and second actuators 26, 29, and a second conduit 59 between the second chambers 54, 34 of the first and second actuators 26, 29. As a result, the pressures in the chambers 33, 34 of the second actuator 29 are substantially identical to the pressures in the chambers 53, 54 of the first actuator 26, when said actuators are connected.

Providing a second actuator 29, arranged according to this second embodiment, to complement the steering assistance provided by an hydraulic actuator 26 makes it possible to greatly reduce the size and volume of the steering gear 15 including said hydraulic actuator 26. As an example, it can be envisaged to implement a smaller steering gear having a weight of around 17 kg instead of around 40 kg. The reduction in the dimensions can be around 30%.

The hydraulic circuit 55 can also comprise a mechanical system 60 including a proportional valve arranged on the steering column 13 in order to control the operation of the first actuator 26, and therefore of the second actuator 29, by allowing hydraulic fluid to flow to the appropriate chamber 53, 54—or to none of said chambers—depending on the action exerted by the driver on the steering wheel 11.

In the variant illustrated in FIGS. 5 and 6, the power steering system 1 further comprises disconnecting means arranged between the first and second actuators 26, 29 in order to allow the second actuator 29 to be hydraulically disconnected from the first actuator 26.

In the depicted implementation, said disconnecting means comprise an isolation valve 61 which is arranged on the conduits 58, 59 connecting the actuators chambers. Said isolation valve 61 can be switched between two positions depending on the current conditions and needs.

As shown in FIG. 5, the isolation valve 61 can be in a first position, in which the second actuator 29 is in fluid communication with the first actuator 25. With this configuration, the second actuator 29 is activated and can provide extra steering assistance. This can typically happen when the vehicle 2 is moving slowly and is being, steered, under normal operation. An additional pump 63 may then be necessary to provide the extra flow of hydraulic fluid required. This additional pump 63 can be, for instance, arranged in parallel of the pump 57.

Besides, as shown in FIG. 6, the isolation valve 61 can be in a second position, in which the second actuator 29 is hydraulically isolated from the first actuator 26 and the first and second chambers 33, 34 of the second actuator 29 are in fluid communication. With this configuration, the second actuator 29 is not operatively connected to the hydraulic circuit 55, a by-pass sub circuit 62 being created. The piston 32 is free to move inside the cylinder barrel 30, thereby not impairing the steering of the wheels 8 by the first steering mechanism 11. This configuration can typically be used in two situations.

On the one hand, the isolation valve 61 can be set in the second position when the vehicle 2 is running at high speed. In this operative conditions, there is no need for a high steering assistance effort. As a consequence, the steering assistance provided by the first actuator 26 is sufficient, even if said first actuator 26 has been downsized as compared to conventional steering actuators for the same type of vehicles. By-passing the second actuator makes it possible to reduce the fuel consumption of the vehicle 2. For example, control means can be provided to deactivate the second actuator 29 in case the vehicle speed is greater than a predetermined threshold, such as 60 km/h.

On the other hand, the isolation valve 61 can be set in the second position when a failure of the second actuator 29 is detected, such as a hydraulic fluid leakage, even if an extra steering assistance would be required. In this case, isolating the second actuator 29 prevents the whole power steering system 1 to be defective, insofar as the first actuator 26 can still provide some steering assistance, even if not sufficiently.

Switching the isolation valve 61 from one position to another can be achieved in various ways. For example, as schematically illustrated in FIGS. 5 and 6, the control means can be capable of moving the isolation valve 61 depending on the pressure received by the first actuator 26.

Thanks to the provision of the second actuator 29, arranged substantially parallel to, and preferably substantially coincident with, the track rod connecting the wheels of the steered axle, the power steering system 1, and in particular the steering gear, can be downsized, thereby freeing space for other equipment, reducing fuel consumption, while always ensuring to the driver an efficient steering assistance.

The invention is of course not limited to the embodiments described above as examples, but encompasses all technical equivalents and alternatives of the means described as well as combinations thereof.

The invention claimed is:

1. A power steering system for a vehicle having at least one steered axle joining two wheels, the power steering system comprising a first steering mechanism designed to control the steering of at least one of the wheels, and comprising:
   a mechanical transmission arranged to transmit movement from a steering wheel of the vehicle to at least a first one of the wheels by an upper steering arm from which the movement continues to a first steering knuckle that makes the first wheel turn, and wherein the movement is transmitted from the first steering knuckle via a lower steering arm, a track rod, and a further lower steering arm to at least a second steering knuckle of a second one of the wheels;
   a first actuator controlled by a parameter related to the steering wheel movement and capable of providing a steering assistance effort to at least one of the wheels; and
   a second steering mechanism designed to control the steering of at least one of the wheels of the same axle, the second steering mechanism including a second actuator capable of providing a steering assistance effort to at least one of the wheels of the axle, the second actuator having:

a housing which is secured to the axle; and first and second piston rods able to slide through the housing and extending, on opposite sides, from inside to outside of the housing; with the piston rods being substantially parallel to the axle, and wherein the piston rods each have one end connected to a link rod, with each link rod being connected to a corresponding lower steering arm, the link rods and the piston rods forming part of the track rod.

2. The power steering system according to claim 1, wherein the second actuator being a hydraulic actuator, the housing of the second actuator being a cylinder barrel and the second actuator comprises a movable piston located in the cylinder barrel and defining inside it at least a first and a second chambers, the piston being connected, on opposite sides thereof, respectively to the first and second piston rods.

3. The power steering system according to claim 1, wherein the axle is a front axle of the vehicle.

4. The power steering system according to claim 1, wherein the first actuator is an electric actuator.

5. The power steering system according to claim 1, wherein the first actuator is a hydraulic actuator.

6. The power steering system according to claim 2, wherein the first actuator is a hydraulic actuator and the second actuator is hydraulically coupled to the first actuator, so that the pressures in the chambers of the second actuator are substantially identical to the pressures in the chambers of the first actuator, when the actuators are connected.

7. The power steering system according to claim 6, comprising disconnecting means arranged between the first and second actuators in order to allow the second actuator to be hydraulically disconnected from the first actuator.

8. The power steering system according to claim 7, wherein the disconnecting means comprises an isolation valve which can be switched between:

a first position, in which the second actuator is in fluid communication with the first actuator;

and a second position, in which the second actuator is hydraulically isolated from the first actuator and the first and second chambers of the second actuator are in fluid communication.

9. The power steering system according to claim 8, comprising control means capable of switching the isolation valve from one position to another depending on the pressure received by the first actuator.

10. The power steering system according to claim 5, comprising a pump arranged to provide the extra flow of hydraulic fluid required in case the second actuator is hydraulically connected to the first actuator.

11. The power steering system according to claim 1, wherein the second actuator is controlled by a parameter related to the steering wheel movement.

12. The power steering system according to claim 1, comprising control means capable of deactivating the second actuator.

13. A vehicle having at least one steered axle joining two wheels, comprising a power steering system according to claim 1.

* * * * *